United States Patent [19]
Haynes

[11] 4,040,090
[45] Aug. 2, 1977

[54] BIAS GATE FOR NOISE SUPPRESSION CIRCUIT

[75] Inventor: William P. Haynes, Bedford, Mass.
[73] Assignee: GTE Laboratories Incorporated, Waltham, Mass.
[21] Appl. No.: 684,210
[22] Filed: May 7, 1976
[51] Int. Cl.² .......................... H04N 5/08; H04N 5/21
[52] U.S. Cl. .................................................... 358/155
[58] Field of Search ............... 358/153, 155, 157, 177, 358/178, 156

[56] References Cited
U.S. PATENT DOCUMENTS
3,860,750 1/1975 Ueda ..................................... 358/156
3,873,768 3/1975 Klein ..................................... 358/155

Primary Examiner—Robert L. Richardson
Attorney, Agent, or Firm—Irving M. Kriegsman; Leslie J. Hart

[57] ABSTRACT

In a gain controlled television receiver the level for detecting noise in a composite video signal is increased during the synchronization pulse intervals of the signal over that during the other intervals of the signal. This level increase is controlled by a gate which is enabled during the simultaneous occurrence of a synchronizing pulse from a sync pulse separator and a flyback pulse from a deflection circuit.

6 Claims, 3 Drawing Figures

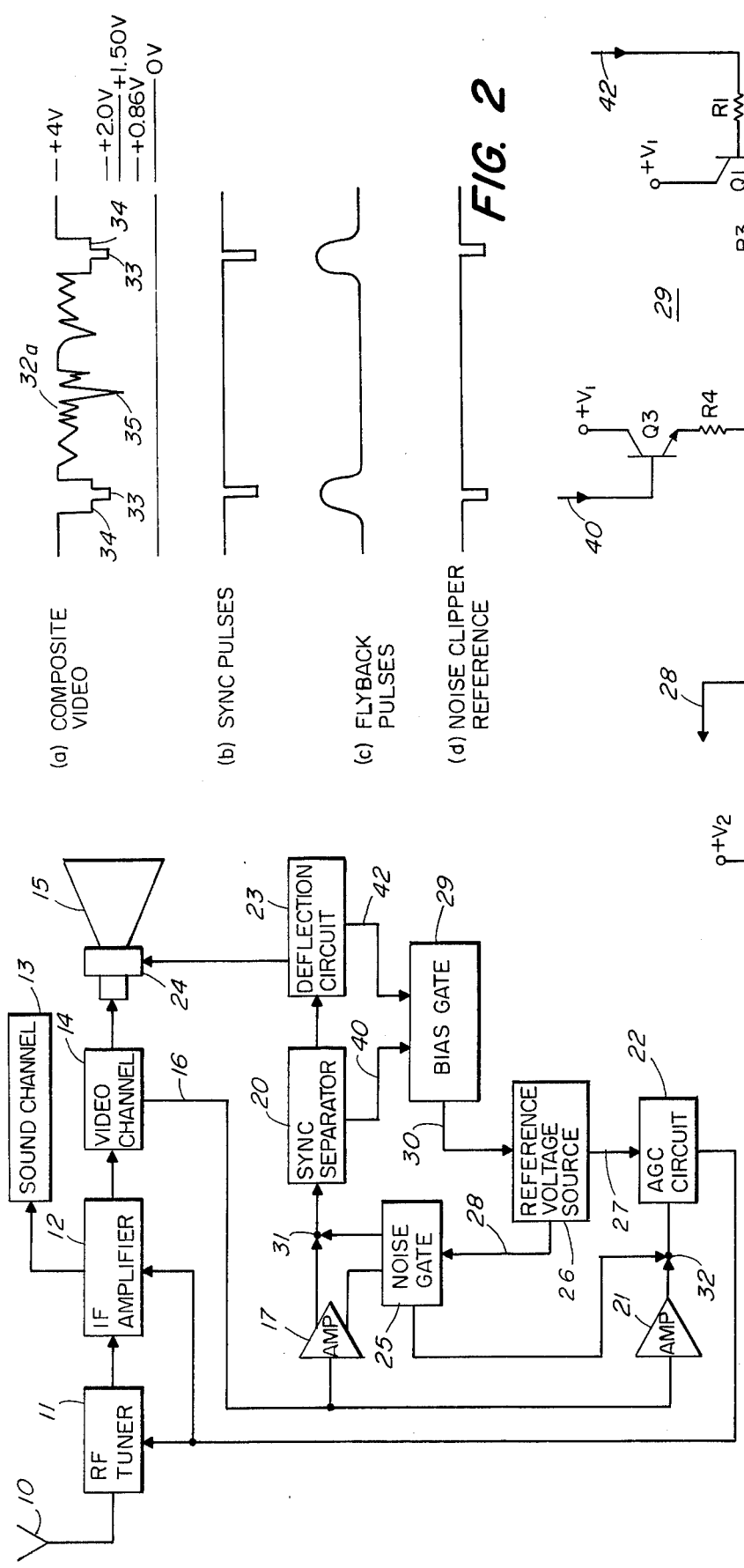

BIAS GATE FOR NOISE SUPPRESSION CIRCUIT

CROSS-REFERENCE TO OTHER APPLICATIONS

A concurrently filed application entitled "Noise Suppression Circuit" bears Ser. No. 684,245 and was filed in the name of Arthur H. Klein, and being assigned to GTE Sylvania, Incorporated, describes and claims a noise suppression circuit for detecting and removing noise within a gain controlled composite video signal. Also, a concurrently filed application entitled "Positive Feedback High Gain AGC Amplifier" bears Ser. No. 684,209 and was filed in the name of William P. Haynes, and being assigned to GTE Laboratories, Incorporated, describes and claims an AGC circuit for providing a gain control signal which is related to the variation of sync pulse amplitude of a gain controlled composite video signal with a reference voltage level.

FIELD OF THE INVENTION

This invention relates to noise suppression circuitry for suppressing noise in video signals in television receivers and more particularly to a noise suppression circuit wherein detected noise pulses are used to suppress or cancel the noise pulses from the video signal.

BACKGROUND OF THE INVENTION

In typical television receivers a radio frequency (RF) modulated television signal is received and processed, i.e., amplified, filtered, and demodulated to provide a composite video signal. The composite video signal contains video information which is utilized to modulate an electron beam or beams in a cathode ray tube and synchronizing information to synchronize the scanning of the electron beams of the cathode ray tube with the video information to create a coherent display. The synchronizing information is in the form of synchronizing pulses which extend beyond the black level of the composite video signal and which occur during the vertical and horizontal retrace or blanking intervals.

The synchronizing pulses are separated from the composite video signal in an amplitude clipper known as a synchronizing pulse separator. High level noise pulses included in the composite video signal may also contain sufficient energy to cause the synchronizing pulse separator to operate thereby deleteriously affecting the scanning of the cathode ray tube. Furthermore, typical synchronizing pulse separator circuits include a self-bias circuit which establishes the clipping level of the circuit. Noise pulses, especially continuous high energy noise, which reach the synchronizing pulse separator circuit affect the self-bias circuit to undesirably alter the clipping level thereby further deleteriously affecting the scanning of the cathode ray tube.

In view of these well-known deleterious effects of noise pulses, much effort has been directed to circuits and schemes for cancelling or suppressing the effect of high level noise pulses. Typical prior art techniques include noise gates which disable the synchronizing pulse separator in the presence of high level noise and noise cancellation circuits which clip and invert the noise pulse and add the inverted noise pulse to the composite video signal to cancel the noise pulse therefrom. Other similar techniques are also known in the prior art.

Typical television receivers also include automatic gain control circuitry which detects the amplitude of the synchronizing pulses and adjusts the gain of the signal receiver amplifiers in response thereto. A noise free composite video signal is also required for the automatic gain control circuitry so that high level noise pulses do not cause undesired gain changes. If the signal level changes abruptly, however, the noise cancellation circuit may cancel the synchronizing pulses from the video signal as well as cancel noise pulses thereby leading to a condition called system "hang-up" where the automatic gain control circuit increases the amplifier gain when the gain should be decreased.

While noise cancellation circuits using various prior art techniques have been developed and operate more or less satisfactorily, they suffer from one or more various disadvantages. For example, some prior art circuits deleteriously affect operation of the television receiver. Other circuits are unduly complex and/or require intricate control adjustment to avoid problems such as hang-up or similar deleterious effects. Other prior art circuits cancel noise only from the synchronizing pulse separator or use compromises which result in deleterious effects under some operating conditions or less than satisfactory performance. Still other prior art circuits or techniques do not readily lend themselves to fabrication in integrated circuit form. Another noise cancellation system is of a fixed bias nature which means the system clips any noise spikes above a predetermined voltage level. This type of system is limited in how close the noise clipping level can be set to the expected synchronization pulse level, this being due to component and environment variations which result in variations of one or more of these levels. This can result in synchronizing pulses being interpreted as noise pulses, especially after a channel having a strong signal is selected.

SUMMARY OF THE INVENTION

Accordingly, it is an object of the invention to eliminate the problem of inadvertent interpretation of synchronizing pulses as noise by the provision of a circuit which can be readily fabricated in integrated circuit form.

It is another object of the invention to provide a noise suppression system in which the noise detection level is close to the level at which synchronizing pulses are controlled but in which synchronizing pulses are not detected as noise.

In one aspect of the invention, a bias gate circuit is provided for use in a television receiver. The receiver is of the type having a gain controlled signal receiver for providing a composite video signal, an automatic gain control circuit for providing a gain control signal to the signal receiver related to the variation of the amplitude of the synchronizing pulses in the composite video signal from a first predetermined reference level so that the tips of the synchronizing pulses are maintained at the first predetermined reference level. Further, the receiver has a noise suppression circuit for detecting and suppressing amplitudes in the composite video signal which exeed a second predetermined reference level equal to or greater than the first predetermined reference level during intervals of the signal other than the interval of the synchronizing pulses, a synchronizing pulse separator for separating the synchronizing pulses from the composite video signal, and a deflection circuit which provides flyback pulses. According to the invention, the bias gate has a device for detecting the simultaneous occurrence of the synchronizing pulses from the synchronizing pulse separator and the flyback pulses from the deflection circuit. The device produces an output signal whose duration is representative of the simultaneous occurrence of the synchronizing and flyback pulses. Further, a device responsive to the output of the detecting device establishes a third predetermined reference level greater than the second predetermined reference level. This third level is directed to the noise suppression circuit to increase the noise detection level during the synchronizing pulse intervals so that only strong noise pulses are suppressed during those intervals.

For a better understanding of the present invention together with other and further objects, advantages, and capabilities, reference is made to the following disclosure in conjunction with the accompanying drawings.

BRIEF DESCRIPTION OF THE DRAWINGS

In the drawings:

FIG. 1 is a block diagram of a portion of a television receiver utilizing the bias gate circuit of the present invention;

FIG. 2a is a waveform diagram of a typical composite video signal containing a noise pulse;

FIG. 2b is a waveform diagram of the synchronizing pulses which are separated from the composite video signal;

FIG. 2c is a waveform diagram of the flyback pulses from the deflection circuit;

FIG. 2d is a waveform diagram of the variable noise clipping voltage according to the invention;

FIG. 3 is a schematic diagram of the preferred embodiment for a noise gate circuit according to the invention.

DESCRIPTION OF PREFERRED EMBODIMENTS

In FIG. 1 a signal receiving means illustrated as an antenna 10 receives and couples a radio frequency (RF) modulated composite video signal to an RF tuner 11 which heterodynes the received signal to a suitable intermediate frequency (IF). The IF signal is coupled to an IF amplifier 12 wherein the IF signal is amplified. The audio portion of the received signal is coupled from IF amplifier 12 to a sound channel 13. The video portion of the IF signal is coupled from IF amplifier 12 to a video channel 14 wherein the IF signal is demodulated to provide a composite video signal. The composite video signal is processed in video channel 14 to provide one or more signals to the electrodes of a cathode ray tube (CRT) 15.

Since the invention is usable in both monochrome and color television receivers, video channel 14 can be the video circuits of a conventional monochrome television receiver or can include both luminance and chrominance circuitry of the type typically found in color television receivers. RF tuner 11, IF amplifier 12, and video channel 14 in general comprise a gain controlled signal receiver for providing a composite video signal. One or more amplifier stages in RF tuner 11 and IF amplifier 12 are typically gain controlled in accordance with a gain control signal derived from the synchronizing pulse amplitude of the composite video signal.

Video channel 14 has an output 16 at which the composite video signal is provided. A video signal coupling means, illustrated as first and second video signal coupling means, is connected to output 16 of video channel 14 for coupling at least the synchronizing pulses contained in the composite video signal to a synchronizing pulse separator and to an automatic gain control circuit. The first video signal coupling means is illustrated as an amplifier 17 which couples the video signal from output 16 to an input of a synchronizing pulse separator 20. The second video signal coupling means is illustrated as an amplifier or buffer 21 which couples the composite video signal from output 16 to an input of an automatic gain control circuit illustrated as an AGC circuit 22.

Sync separator 20 provides separated synchronizing pulses to vertical and horizontal deflection circuits 23 which provide suitable vertical and horizontal scanning signals to a deflection yoke 24 associated with CRT 15. AGC circuit 22 provides suitable gain control signals to gain control inputs of RF tuner 11 and IF amplifier 12.

A noise detecting means illustrated as a noise gate 25 has an input connected to the video signal coupling means, for example, by coupling the input of noise gate 25 to an output of amplifier 17. A voltage reference circuit provides a reference voltage via a line 27 to the AGC circuit 22, and a reference voltage via a line 28 to the noise gate 25. The reference voltage to the AGC circuit 22 establishes a first predetermined reference level at which the synchronizing pulses of the composite video signal are to be maintained. The reference voltage to the noise gate 25 establishes a second predetermined reference level equal to or greater than the first predetermined reference level for detecting and suppressing amplitudes in the composite video signal which exceed the second reference level. As will be described subsequently, the second predetermined reference level is generated only during intervals other than those of the synchronizing pulses of the composite video signal. A bias gate 29 receives the synchronizing pulses via a line 40 and shown in FIG. 2b from the sync separator 20 and the retrace or flyback pulse signal via a line 42 and shown in FIG. 2c from the deflection circuit 23. Bias gate 29 provides an output signal via a line 30 for altering the reference voltage source 26 so as to produce an output line 28 a different reference voltage so as to produce a third predetermined reference level during the simultaneous occurrence of the synchronizing pulses and the flyback pulses. This third predetermined reference level is greater than the second predetermined reference level. Noise gate 25 provides a noise signal to a noise junction 31, intermediate amplifier 17 and sync separator 22 and to a junction 32, intermediate buffer 21 and AGC circuit 22. This noise signal cancels the noise contained within the composite video signal.

In referring to the predetermined reference levels, the levels are referenced to an arbitrary, preselected voltage level at which the composite video signal at output 16 is referred to. This preselected level may in theory be any voltage and, of course, need not be zero volts. Thus, when referring to one predetermined reference level being greater than another, the adjective "greater" means further displaced from this arbitrary voltage. In the preferred embodiment, wherein the sync pulses are negative going, this arbitrary voltage level is about +4 volts, the first predetermined reference level is +2.0 volts, the second predetermined voltage level is +1.5 volts, and the third predetermined reference level is +0.86 volts.

FIG. 2a is a waveform diagram of a composite video signal 32$_a$ representative of the signal provided at output 16 of video channel 14. Video signal 32$_a$ has synchronizing pulses 33 with video information between the synchronizing pulses. Synchronizing pulses 33 ride on blanking pulses 34. In normal operation, sync separator 20 clips synchronizing pulses 33 without clipping blanking pulses 34. Synchronizing pulses 33 are coupled to deflection circuits 23 to synchronize the scanning of CRT 14 with the video information coupled from video channel 14 to CRT 15.

A noise pulse 35, typical of the type of noise pulses which may be found in video signal 32, is illustrated in FIG. 2a. Since sync separator 20 is an amplitude clipper, noise pulse 35 will also be clipped and coupled to deflection circuits 23 which will deleteriously affect scanning of CRT 15. Video signal $32_a$ is coupled, however, to noise gate 25 which detects noise such as noise pulse 35 contained in video signal $32_a$ when the noise has an amplitude greater than the second predetermined reference level.

The noise signal from noise gate 25 is coupled to junctions 31 and 32 with phase and amplitude relationships sufficient to suppress or cancel the noise pulse. Complete cancellation of noise pulse 35 is not necessary; it is only necessary to reduce the amplitude of noise pulse 35 below the amplitude of synchronizing pulses 33 at junctions 31 and 32 so that sync separator 20 and AGC circuit 22 do not respond to noise pulse 35.

While a relatively short noise pulse 35 is illustrated, noise pulses due to buzzer noise or similar phenomena may extend over several scan lines. Such noise pulses will drastically alter the bias of sync separator 20 requiring additional time for sync separator 20 to revert to proper operation. Accordingly, the detected noise signal from noise gate 25 is preferably direct current coupled to junction 31 so that long pulses or concentrated noise pulses are fully cancelled regardless of duration.

AGC circuit 22 detects the amplitude of synchronizing pulses 33 and develops a control voltage dependent upon that amplitude. Noise pulses such as noise pulse 35 with sufficient amplitude, however, will alter the control voltage from AGC circuit 22. Such noise pulses are also cancelled or suppressed at junction 32 to eliminate deleterious effects in the AGC system. The AGC system, however, is a closed loop feedback system which is subject to hang-up under some conditions of operation. For example, if there is a sudden increase in signal strength due to a channel change or the like, noise gate 25 may clip portions of video signal $32_a$ in addition to noise pulse 35. AGC circuit 22 will receive an altered video signal without synchronizing pulses which will be treated as a weak signal instead of a strong signal. To prevent this condition from persisting, the noise signal is alternating current coupled to junction 32 so that after a predetermined interval or duration the noise signal will terminate.

The amplifier 17, noise gate 25 and sync separator are defined herein as a noise suppression circuit. One suitable circuit for use in conjunction with the bias gate circuit of this invention is described with additional detail in the previously-identified patent application of Arthur H. Klein. One suitable AGC circuit for use in conjunction with the bias gate circuit of the present invention is described with additional detail in the previously-mentioned patent application to William P. Haynes.

Referring now to FIG. 3, the bias gate circuit has the bias gate 29 for detecting the simultaneous occurrence of synchronizing pulses from the synchronizing pulse separator and the flyback pulses from the deflection circuit to produce an output signal at a line 30 whose duration is representative of the simultaneous occurrence thereof. The circuit also includes a reference voltage source 26 responsive to the output signal of the bias gate 29 for establishing a third predetermined reference level via the output line 28 for the noise suppression circuit to increase the noise detection level during synchronizing pulse intervals.

Referring now more specifically to the bias gate 29, such gate in essence comprises an AND gate providing an output signal on the simultaneous occurrence of synchronizing pulses and the flyback pulses. The AND gate has a device for coupling the retrace signal at 42 to the output line 46. Preferably, the coupling device is a transistor Q1 in an emitter follower configuration to serve as a buffer between the flyback transformer of the deflection circuit and the bias gate. It should be understood, however, that the coupling device could also be merely a resistor. The transistor Q1 receives a flyback pulses at 42 at a base terminal via a resistor R1. The collector of the transistor Q1 is coupled to a source of positive voltage +V1 and the emitter is coupled via a resistor R2 to circuit ground. As shown in FIG. 2c, the flyback pulses are positive going, and the transistor Q1 is biased so as to conduct during the pulse intervals thereby providing a positive going output pulse at the emitter of Q1.

A transistor Q2 has a collector coupled to the emitter of the transistor Q1 via a resistor R3 and an emitter coupled to ground. The base of the transistor Q2 is coupled to a biasing network which is responsive to the synchronizing pulses at 40 to cause the transistor Q2 to conduct in the absence of synchronizing pulses as shown in FIG. 2b, and to be non-conductive in the presence of synchronizing pulses. The synchronizing pulses are coupled to the base of a transistor Q3 whose collector is coupled to a source of positive voltage +V1 and whose emitter is coupled to a resistor R4. The resistor R4 is in turn coupled to a zener diode D1 which is coupled both to the base of the transistor Q2 and to a resistor R5 coupled to ground. The zener diode D1 reduces power consumption in the biasing network for the transistor Q2. In the absence of synchronizing pulses, the transistor Q3 is highly conductive which causes the base of the transistor Q2 to be more positive. This in turn causes Q2 to conduct thereby bringing the output line 30 substantially to zero volts. When the negative going synchronizing pulses occur, transistor Q3 is cut-off, which lowers the potential of the base of transistor Q2. This causes Q2 to become non-conductive. If at the same time that the transistor Q2 is cut-off, a flyback pulse occurs, then a positive going pulse is applied to the line 30.

The voltage reference source 26 supplies the constant reference voltage at line 27 for the AGC circuit 22 and a variable voltage on the line 28 for the noise gate 25. This variable voltage on the line 28 is controlled by the positive going pulse on the line 30. More specifically, as line 30 goes positive, the transistor Q4 conducts thereby shunting a resistor R6.

Voltage reference circuit 26 includes a transistor Q5. Source +V2 is connected by a diode D2 and a resistor R7 connected in series to a base of transistor Q5. The base of transistor Q4 is further connected by a resistor R8 to circuit ground. Source +V2 is further connected by a resistor R9 in series with a diode D3 to an emitter of transistor Q5 which further has a collector connected to circuit ground. Transistor Q5 provides a reference voltage at its emitter which is coupled to the AGC circuit.

The junction between resistor R9 and diode D3 is connected to a base of a transistor Q6. A collector of transistor Q6 is connected to source +V2. Resistors R10, R11, and R6 are connected in series between an emitter of transistor Q6 and circuit ground. The junction between resistors R10 and R11 is coupled to the noise gate 25. Diode D3 compensates for the base-emitter voltage drop of transistor Q6 so that the emitter voltage of transistor Q6 is equal to the emitter voltage of transistor Q5. Accordingly, the voltages at the emitter of transistor Q5 and at the emitter of transistor Q6 are equal to the voltage of the tip of the synchronizing pulses at junction 16.

The noise clipping reference level at the noise gate is equal to the emitter voltage of transistor Q6 reduced by the resistor divider network including resistors R10, R11, and R6. Since the resistor ratios can be accurately controlled, the noise detecting reference level can be accurately controlled with respect to the tip of the synchronizing pulses. Thus, when transistor Q4 is non-conductive, the voltage at 28 is some positive value whereas when transistor Q4 is conducting, the voltage at 28 is less positive than before.

In summary, this invention is based on the existance of a common reference for both the automatic gain control circuitry, which sets the level of the synchronizing pulses, and for the noise clipping or suppression circuit. In addition, a two level noise clipping reference is implemented which utilizes synchronization pulses and pulses from the television horizontal output transformer (flyback pulses) to modify the noise clipping reference. The noise clipping reference signal is a predetermined percentage of the reference used to establish the automatic gain control (AGC) reference. By using the same reference for both the AGC and the noise clipper, the relationship of the noise level to the synchronization pulse level can be accurately defined. The percentage of the AGC reference voltage that is used for noise clipping is modified when both synchronization pulses and flyback pulses are present. During the coincidence of synchronization pulses and flyback pulses, the noise clipper reference level is reduced from near one hundred percent of the synchronization level to roughly one half the synchronization pulse level. By using this system, a noise clipping reference level very close to the sync tip can be used for the video information portion of the composite video signal. Only during synchronization pulse times is the noise clipping reference backed off. If only the synchronization pulse was used to control the noise gate level, then any noise pulses that got into the synchronizing pulse separator would reduce the clipper reference level and the noise rejection performance would be impaired. By using both synchronization and flyback, only during the synchronization time is the noise clipper level reduced. The flyback or retrace pulse alone could not be used because its pulse width as shown in FIG. 2c is too wide. The primary advantage of the present invention is that by backing off on the noise clipping reference level during sync pulse intervals the noise clipping reference level during non-sync pulse intervals may be set much closer to the sync tip reference level.

The embodiment of the present invention is intended to be merely exemplary and those skilled in the art shall be able to make numerous variations and modifications of it without departing from the spirit and scope of the present invention. All such variations and modifications are intended to be within the scope of the present invention as defined by the appended claims.

I claim:

1. In a television receiver having a gain controlled signal receiver for providing a composite video signal, an automatic gain control circuit for providing a gain control signal to the signal receiver related to the variation of the amplitude of the synchronizing pulses in the composite video signal from a first predetermined reference level so that the tips of the synchronizing pulses are maintained at the first predetermined reference level, a noise suppression circuit for detecting and suppressing amplitudes in the composite video signal which exceed a second predetermined reference level equal to or greater than the first predetermined reference level during intervals of the signal other than the intervals of the synchronizing pulses, a synchronizing pulse separator for separating the synchronizing pulses from the composite video signal, and a deflection circuit which provides flyback pulses, a bias gate circuit comprising:
 a. means for detecting the simultaneous occurrence of synchronizing pulses from the synchronizing pulse separator and the flyback pulses from the deflection circuit to produce an output signal whose duration is representative of the simultaneous occurrence thereof, and
 b. means responsive to the signal representative of the simultaneous occurrence for establishing a third predetermined reference level greater than the second predetermined reference level for the noise suppression circuit to increase the noise detection level during synchronizing pulse intervals so that only strong noise pulses generated during synchronizing pulse intervals are suppressed.

2. The bias gate according to claim 1 wherein the means for establishing the third predetermined reference level includes a resistive divider network having switch means associated therewith and responsive to the output signal of the detecting means for generating the second or third predetermined reference levels depending upon the state of the switch means.

3. The bias gate according to claim 2 wherein the detecting means includes AND gate means receiving the synchronizing and flyback pulses and providing the output signal when both pulses occur.

4. The bias gate according to claim 2 wherein the AND gate means includes:
 a. coupling means receiving the flyback pulses for producing an output signal which is effective to activate the switch means,
 b. a transistor having a base terminal biasing network responsive to the synchronizing pulses to cause the transistor to conduct in the absence of synchronizing pulses and to be non-conductive in the presence of synchronizing pulses, and
 c. the collector terminal of the transistor being coupled to the coupling means so that the collector to emitter circuit of the transistor forms a shunt path for the output signal of the coupling means when the transistor is conducting.

5. The bias gate according to claim 4 wherein the switch means includes a transistor whose base receives the output signal and whose collector and emitter terminals are coupled across a resistor of the divider network to remove the resistor from the divider network when the transistor of the switch means conducts.

6. The bias gate circuit according to claim 4 wherein the coupling means includes a transistor receiving the flyback pulses at a base terminal and being biased to conduct when the flyback pulses occur and forming the output signal at an emitter terminal.

* * * * *